United States Patent
Nezhad-Ahmadi et al.

(10) Patent No.: US 10,278,218 B2
(45) Date of Patent: Apr. 30, 2019

(54) EFFICIENT CLOSED LOOP TUNING USING SIGNAL STRENGTH

(71) Applicant: SEMICONDUCTOR COMPONENTS INDUSTRIES, LLC, Phoenix, AZ (US)

(72) Inventors: Mohammad-Reza Nezhad-Ahmadi, Waterloo (CA); Andrew Kuikman, Kitchener (CA)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 16/129,559

(22) Filed: Sep. 12, 2018

(65) Prior Publication Data

US 2019/0014605 A1    Jan. 10, 2019

Related U.S. Application Data

(62) Division of application No. 15/166,853, filed on May 27, 2016, now Pat. No. 10,129,915.

(51) Int. Cl.
*H04B 1/10* (2006.01)
*H04B 1/18* (2006.01)
*H04W 76/10* (2018.01)

(52) U.S. Cl.
CPC .......... *H04W 76/10* (2018.02); *H04B 1/1036* (2013.01); *H04B 1/18* (2013.01); *H04B 2001/1072* (2013.01)

(58) Field of Classification Search
CPC ............... H04B 1/1027; H04B 1/40; H04B 2001/1072; H04W 24/10; H04W 76/02
See application file for complete search history.

(56) References Cited

U.S. PATENT DOCUMENTS

| | | | | |
|---|---|---|---|---|
| 7,683,842 | B1* | 3/2010 | Engel | H04K 3/822 342/170 |
| 2003/0040291 | A1* | 2/2003 | Brewer | A61N 1/37223 455/127.1 |
| 2004/0009754 | A1* | 1/2004 | Smith, Jr. | H03H 7/40 455/82 |
| 2007/0285326 | A1 | 12/2007 | McKinzie | |
| 2009/0224991 | A1 | 9/2009 | Rowson et al. | |
| 2011/0032165 | A1 | 2/2011 | Heng et al. | |
| 2013/0002511 | A1* | 1/2013 | Higaki | H01Q 9/42 343/861 |
| 2013/0196610 | A1* | 8/2013 | Sanji | H04B 1/0458 455/193.1 |
| 2013/0295863 | A1* | 11/2013 | Shanan | H03F 3/193 455/226.2 |
| 2017/0025897 | A1* | 1/2017 | Menegoli | H02J 50/12 |

* cited by examiner

*Primary Examiner* — Lewis G West
(74) *Attorney, Agent, or Firm* — Dickinson Wright PLLC (57) ABSTRACT

A wireless communication system, in some embodiments, comprises: a receiver; one or more tunable elements, coupled to the receiver, to adjust an impedance of the system; and a processor, coupled to the one or more tunable elements, to tune said one or more tunable elements based on the strength of a received signal.

20 Claims, 5 Drawing Sheets

EFFICIENT CLOSED LOOP TUNING USING SIGNAL STRENGTH

CROSS-REFERENCE TO RELATED APPLICATIONS

This application is a divisional application of U.S. application Ser. No. 15/166,853 filed May 27, 2016 and titled "Efficient Closed-Loop Tuning Using Signal Strength" (now U.S. Pat. No. 10,129,915), which application is incorporated by reference herein as if reproduced in full below.

BACKGROUND

Wireless devices frequently experience loading effects as a result of various environmental factors. For instance, wireless medical devices that are intended for use in or on the human body experience different loading effects depending on, e.g., the physical attributes of the body with which the device is used, the location in or on the body, the body's environment, antenna sensitivity, and wireless signal frequency. Failure to mitigate such loading effects by properly matching antenna and transceiver impedances negatively impacts wireless device performance.

Current solutions are inadequate in various respects. Open-loop matching techniques fail to account for dynamic variations in loading effects that result from changes in the environment in which the wireless devices operate. Moreover, traditional closed-loop matching techniques require the use of expensive components that occupy valuable space (e.g., directional couplers for measuring antenna impedance values), which makes such techniques particularly unsuitable for use in diminutive wireless medical devices.

SUMMARY

At least some of the embodiments disclosed herein are directed to a wireless communication system, comprising: a receiver; one or more tunable elements, coupled to the receiver, to adjust an impedance of the system; and a processor, coupled to the one or more tunable elements, to tune said one or more tunable elements based on the strength of a received signal. At least some of these embodiments may be supplemented using one or more of the following concepts, in any order and in any combination: wherein, to tune said one or more tunable elements based on the received signal strength, the processor identifies a set of tuning states for the one or more tunable elements, identifies the tuning state among said set that maximizes the received signal strength, and adjusts the one or more tunable elements to implement said identified tuning state; wherein the processor is part of the receiver; wherein the processor evaluates the received signal strength using a value selected from the group consisting of: received signal strength indicator (RSSI) and received channel power indicator (RCPI); wherein said one or more tunable elements are selected from the group consisting of: a tunable antenna and a tunable matching network; wherein said one or more tunable elements include variable capacitors; further comprising: a transmitter; one or more additional tunable elements coupled to the transmitter; and another processor, coupled to said one or more additional tunable elements, to tune said one or more additional tunable elements based on said received signal strength.

At least some embodiments are directed to a system, comprising: a transmitter; one or more tunable elements, coupled to the transmitter, to adjust an impedance of the system; and a processor, coupled to said one or more tunable elements, to tune said one or more tunable elements based on the strength of a transmitted signal. At least some of these embodiments may be supplemented using one or more of the following concepts, in any order and in any combination: wherein the one or more tunable elements are selected from the group consisting of: a tunable antenna and a tunable matching network; wherein the processor tunes the one or more tunable elements to determine which of multiple tuning states maximizes said strength; wherein, to perform said tuning based on said strength, the processor tunes the one or more tunable elements and subsequently evaluates a received signal strength indicator (RSSI) signal or received channel power indicator (RCPI) signal obtained from the receiver; wherein, to perform said tuning based on said strength, the processor tunes the one or more tunable elements and subsequently determines the extent to which output power of the transmitter is affected; wherein, to perform said tuning based on said strength, the processor tunes the one or more tunable elements and subsequently determines the extent to which the current output by a system battery is affected.

At least some embodiments are directed to a method, comprising: establishing a wireless link between a transmitter system and a receiver system; identifying a receiver tuning state based on the strength of a received signal; setting one or more tunable elements in the receiver system to said identified receiver tuning state; sending a trigger from the receiver system to the transmitter system to begin tuning the transmitter system; identifying a transmitter tuning state that maximizes the strength of a signal transmitted by said transmitter system to the receiver system; and setting one or more additional tunable elements in the transmitter system to said identified transmitter tuning state, wherein the receiver and transmitter tuning states affect impedances of the receiver and transmitter systems, respectively. At least some of these embodiments may be supplemented using one or more of the following concepts, in any order and in any combination: further comprising commencing the identification of said receiver tuning state upon the occurrence of an event selected from the group consisting of: a predetermined amount of time elapsing since said receiver tuning state was last set; a wireless device housing the receiver waking from a dormant state; and the received signal strength falling below a predetermined threshold; wherein identifying said receiver tuning state comprises: tuning the receiver system to each of a set of tuning states; and measuring the received signal strength when the receiver system is tuned to each tuning state in said set; wherein said set of tuning states includes all available tuning states in said receiver system; wherein said set of tuning states includes fewer than all available tuning states in said receiver system; wherein said identified transmitter tuning state maximizes a received signal strength indicator (RSSI) or a received channel power indicator (RCPI) in said receiver system; wherein identifying said transmitter tuning state comprises monitoring a transmitter system battery current.

The specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims. The term "couple" and variants thereof, as used herein, indicate a direct or indirect connection.

DETAILED DESCRIPTION

Disclosed herein are closed-loop impedance matching techniques that entail tuning transmitter and receiver systems based on indications of wireless signal strength. In some embodiments, a receiver system contains one or more tunable elements that may be used to match impedances between an antenna and a receiver in the receiver system. Each distinct configuration of the tunable elements is considered to be a separate tuning state of the system. A processor in the receiver system adjusts the tunable elements to implement different tuning states and, as it does so, it evaluates one or more indicators of received signal strength, such as received signal strength indicator (RSSI) values or received channel power indicator (RCPI) values. The processor implements the tuning state that maximizes the received signal strength.

The receiver system, which also functions as a transceiver, then sends a trigger signal to the transmitter system, which causes the transmitter system to begin tuning its own tunable elements. Like the receiver system, the transmitter system contains a processor that adjusts the tunable elements to implement various tuning states. The processor evaluates one or more indicators of transmitted signal strength in each of these tuning states. Such indicators may include, for example, fluctuations in the transmitter system battery current or a power detector measurement at the output stage of a transmitter in the transmitter system. Such indicators may also include an RSSI or RCPI value provided by the receiver (acting as a transceiver). These RSSI and RCPI values, although obtained from the receiver, directly relate to the strength with which the transmission system is transmitting signals. The processor identifies the tuning state that maximizes one or more such indicators (or an average of such indicators, or another desired mathematical computation involving such indicators) and implements that tuning state.

The foregoing tuning processes may be executed in the receiver and/or transmitter systems regularly or irregularly. For example, if either or both of these systems are included in a wireless medical product that infrequently engages in wireless communications, one or both of the foregoing tuning processes may be performed just prior to each such communication. Conversely, if either or both of the systems form part of a product that frequently engages in wireless communications, one or both of the foregoing tuning processes may be performed at regular intervals or when one or more signal strength indicators drop below predetermined thresholds.

As explained, in both the receiver and transmitter systems, one or more signal strength indicators are used to evaluate various tuning states, and such indicators can include—without limitation—RSSI values, RCPI values, battery current fluctuations, transmitter output stage power measurements, and the like. Such indicators are readily accessible and require minimal or no additional circuitry, thus mitigating expense and space requirements. Preferably, however, such indicators do not include direct measurements of antenna impedance using directional couplers, which are relatively expensive and occupy a substantial amount of space.

Figure 1A:
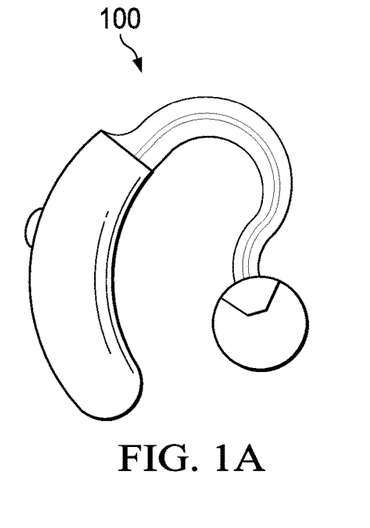
FIGS. 1A-1B depict illustrative wireless medical devices.
Figure 1B:
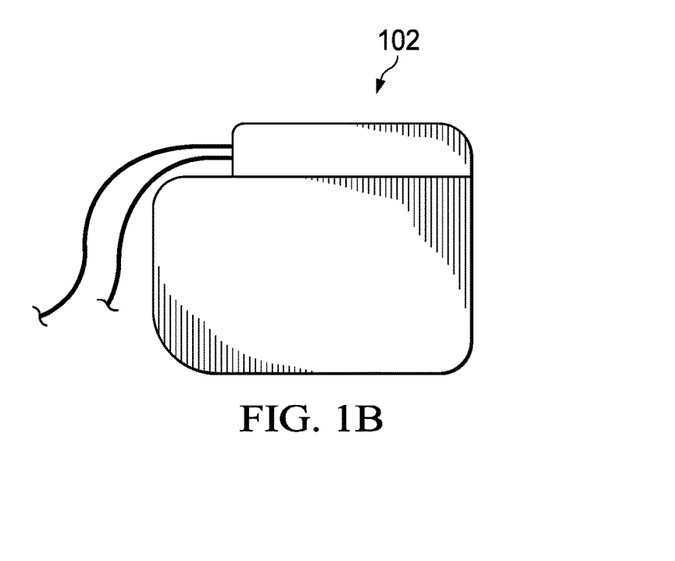

FIGS. 1A-1B depict illustrative wireless medical devices that may implement one or more of the techniques disclosed herein. Specifically, FIG. 1A includes a hearing aid 100 and FIG. 1B includes a pacemaker 102. The hearing aid 100 may house a transmitter system, receiver system or transceiver system that executes the disclosed tuning techniques to enhance wireless communications with, e.g., a mobile phone, media player, personal computer or other device. Similarly, the pacemaker 102 may house a transmitter system, receiver system or transceiver system that executes the disclosed tuning techniques to facilitate wireless communications with, e.g., storage devices that can receive recordings of cardiac electrical activity from the pacemaker 102. The hearing aid 100 and pacemaker 102 are merely representative of a broad array of wireless devices and systems that can benefit from implementing the disclosed tuning techniques. The scope of disclosure is not limited to medical devices and includes any and all transmitter and receiver systems that benefit from closed-loop impedance matching.

Figure 2:
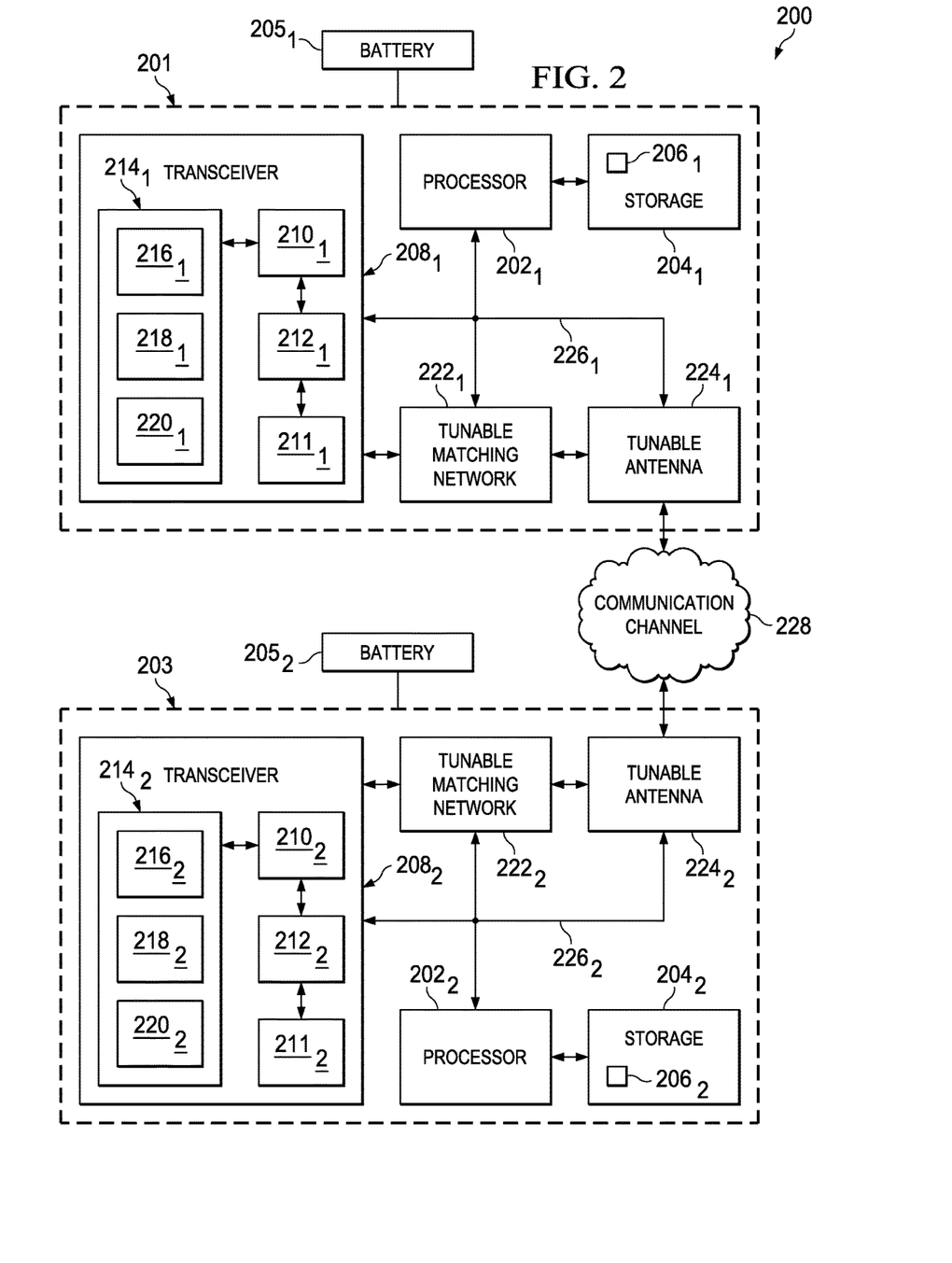
FIG. 2 is a block diagram of an illustrative wireless communication system.

FIG. 2 is a block diagram of an illustrative wireless communication system 200. The system 200 comprises a transmitter system 201 and a receiver system 203. Although systems 201 and 203 are designated as transmitter and receiver systems, respectively, in at least some embodiments each of the systems contains a transceiver that enables the system to function as both a transmitter and a receiver system. The transmitter system 201 and/or receiver system 203 may form part of a wireless system or device, including wireless medical devices (e.g., external devices such as hearing aids and glucose monitors; implantable devices such as neurological stimulators and pacemakers). The transmitter system 201 includes a processor $202_1$; storage (e.g., random access memory (RAM)) $204_1$ storing software $206_1$ and coupling to the processor $202_1$; a transceiver $208_1$ coupling to a bus $226_1$ and comprising a processor $210_1$, an output stage power detector $211_1$, signal strength detector $212_1$, and storage (e.g., RAM) $214_1$ storing tuning search algorithm $216_1$, tunable element control software $218_1$, and signal strength analysis software $220_1$; a tunable matching network $222_1$ (also referred to as a "tunable element") coupling to transceiver $208_1$ and to bus $226_1$; and a tunable antenna $224_1$ (also called a "tunable element") coupling to tunable matching network $222_1$ and to bus $226_1$. The transmitter system 201 is powered by a battery $205_1$.

The transmitter system 201 communicates with the receiver system 203 via communication channel 228. The receiver system 203 includes a processor $202_2$; storage (e.g., random access memory (RAM)) $204_2$ storing software $206_2$ and coupling to the processor $202_2$; a transceiver $208_2$ coupling to a bus $226_2$ and comprising a processor $210_2$, an output stage power detector $211_2$, signal strength detector $212_2$, and storage (e.g., RAM) $214_2$ storing tuning search algorithm $216_2$, tunable element control software $218_2$, and signal strength analysis software $220_2$; a tunable matching network $222_2$ (also referred to as a "tunable element") coupling to transceiver $208_2$ and to bus $226_2$; and a tunable antenna $224_2$ (or "tunable element") coupling to tunable matching network $222_2$ and to bus $226_2$. The receiver system 203 is powered by a battery $205_2$.

The processor $202_1$ executes software $206_1$ to perform some or all of its functions. These functions include, without limitation, setting tuning states for the transmitter system 201 by adjusting the tunable matching network $222_1$ and/or the tunable antenna $224_1$. The transceiver $208_1$ processes and modulates signals for transmission via the tunable antenna $224_1$ or, alternatively, de-modulates and processes signals received via the tunable antenna $224_1$. The transceiver's functions are performed by the processor $210_1$ as a result of executing the tuning search algorithm $216_1$, the tunable element control software $218_1$, and/or the signal strength analysis software $220_1$. Executing the tuning search algorithm $216_1$ causes the processor $210_1$ to cycle through multiple different tuning states and to evaluate indications of signal strength—for instance, RSSI—for each tuning state. The tuning search algorithm $216_1$ thus facilitates the identification of a tuning state that maximizes indications of signal strength and is described with respect to FIGS. 6 and 7 below.

When executing the tuning search algorithm $216_1$, the processor $210_1$ adjusts the tunable matching network $222_1$ and/or the tunable antenna $224_1$ by executing the tunable element control software $218_1$. The processor $210_1$ may perform this tuning function on its own or may share its tuning function with the processor $202_1$. Alternatively, it may instruct the processor $202_1$ to perform the tuning function on its own. Further, when executing the tuning search algorithm $216_1$, the processor $210_1$ obtains indications of signal strength (e.g., RSSI or RCPI) by executing the signal strength analysis software $220_1$. When executed, the software $220_1$ causes the processor $210_1$ to obtain signal strength indicators from the signal strength detector $212_1$ or from any other suitable source.

The signal strength detector $212_1$ is any suitable device for monitoring signal strength indicators, and it provides such indications to the processor $210_1$. In some embodiments, the signal strength detector $212_1$ is an RSSI detector or an RCPI detector. In some embodiments, the detector $212_1$ couples to the system battery $205_1$ to measure the current flowing from the battery (since an increase or decrease in battery current indicates a corresponding increase or decrease in transmission power). In some embodiments, the detector $212_1$ couples to the power detector $211_1$ at the output stage of the transceiver $208_1$ to determine the power of the signal output by the transceiver $208_1$ (since an increase or decrease in output power indicates a corresponding increase or decrease in transmission power). The scope of disclosure is not limited to these measures of signal strength, and any and all equivalents besides direct impedance measurements using directional couplers are contemplated. Furthermore, the types of signal strength indicators obtained by the signal strength detector $212_1$ depends in part on whether the transceiver $208_1$ is functioning as a transmitter or a receiver. For example, when functioning as a receiver, the detector $212_1$ may obtain RSSI and RCPI values. Conversely, when functioning as a transmitter, the detector $212_1$ may obtain output stage signal power values and/or battery current values.

The components and functions of the receiver system 203 are similar to those of the transmitter system 201. Similarly-numbered components in each of the two systems correspond to each other and share similar functions. Thus, for instance, the processor $210_2$ of the receiver system 203 performs the same or similar functions as the processor $210_1$ of the transmitter system 201, and the tunable matching network $222_2$ of the receiver system 203 performs the same or similar functions as the tunable matching network $222_1$ of the transmitter system 201.

Figure 3:
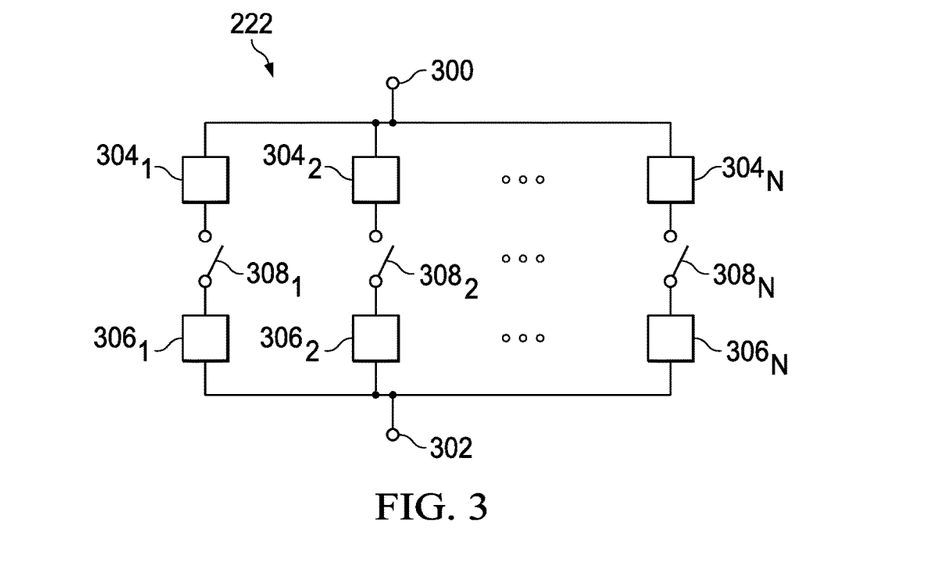
FIG. 3 is a block diagram of an illustrative tunable matching network.

FIG. 3 is a block diagram of an illustrative tunable matching network 222 and is representative of the tunable matching networks $222_1$ and $222_2$ of FIG. 2. However, various other matching networks may be used and are included within the scope of this disclosure. The tunable matching network 222 comprises nodes 300 and 302 for coupling to the transmission or reception line in the transmitter or receiver system. The network 222 also comprises multiple cells $304_1$, $304_2$, ..., $304_N$ and $306_1$, $306_2$, ..., $306_N$. These cells may include components such as inductors, capacitors, or various combinations thereof. The network 222 further comprises switches $308_1$, $308_2$, ..., $308_N$. The switches may include any suitable type of switch, such as transistors, and they are controlled by one or more of the processors in the transmitter system 201. Each switch is positioned between two cells; thus, for instance, switch $308_1$ is positioned between cells $304_1$ and $306_1$. Closing a switch causes the corresponding cells to be coupled in series. One or more of the N switches may be simultaneously closed, thus providing additional impedance (tuning) states. Each possible configuration of switches 308 provides a different tuning state for the tunable matching network 222, and additional tuning states are obtained by combining each configuration of switches 308 with each possible impedance value achievable by the tunable antenna $224_1$.

Figure 4:
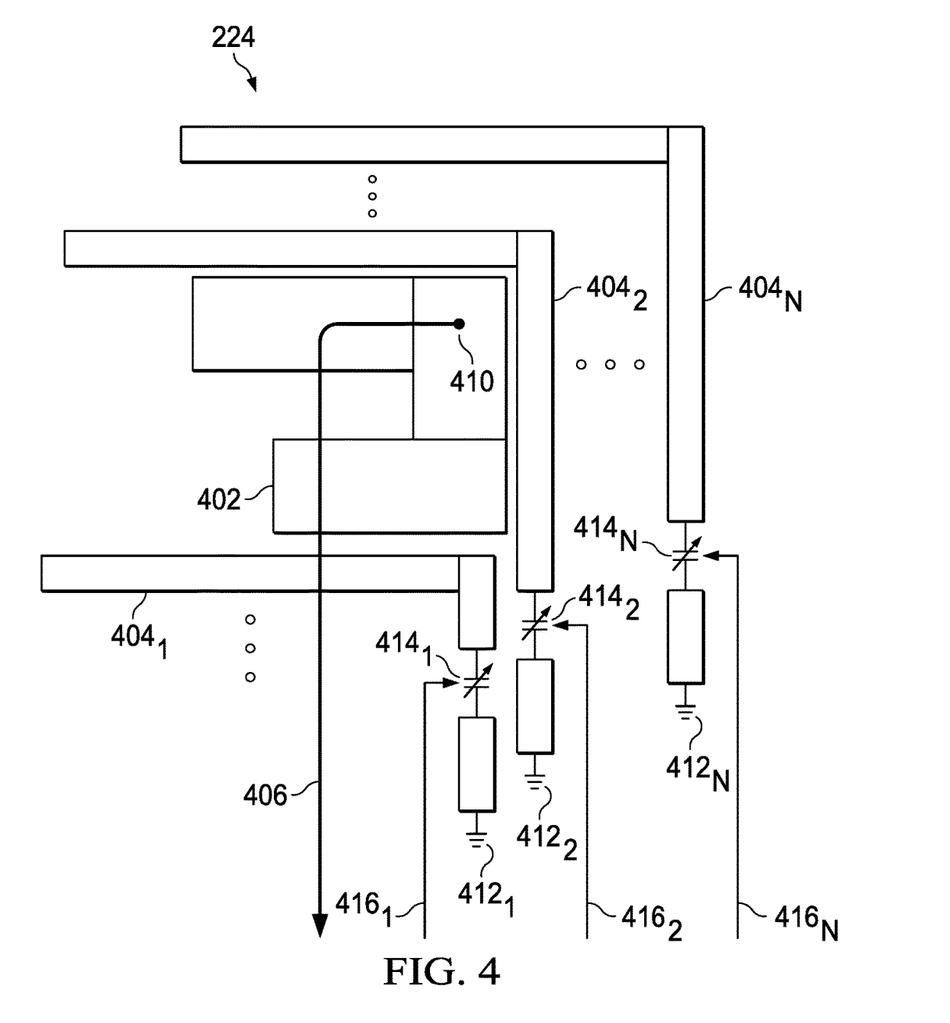
FIG. 4 is a schematic diagram of an illustrative tunable antenna.

FIG. 4 is a schematic diagram of an illustrative, multi-resonance, tunable antenna 224 and is representative of the tunable antennas $224_1$ and $224_2$ of FIG. 2. The scope of disclosure is not limited to the specific antenna shown in FIG. 4, and any and all types of tunable antennas are encompassed within the scope of this disclosure. The tunable antenna 224 comprises a central element 402; coupling elements $404_1$, $404_2$, ..., $404_N$; a microcoax cable 406; a feed point 410; ground connections $412_1$, $412_2$, ..., $412_N$; variable capacitors $414_1$, $414_2$, ..., $414_N$ (e.g., barium strontium titanate capacitors that may range from 2.05 pico Farads to 8.2 pico Farads, inclusive); and control signal connections $416_1$, $416_2$, ..., $416_N$ that control the variable capacitors based on signals from one or more processors in the transmitter system 201 and/or receiver system 203. The variable capacitors preferably are analog capacitors to provide greater granularity than digital capacitors, although digital capacitors are also contemplated. In some embodiments, one or more of the coupling elements may connect to multiple variable capacitors. The central and coupling elements are formed as desired using well-known techniques and with specific geometries that accomplish specific design objectives. In at least some embodiments, the variable capacitors $414_1$, $414_2$, ..., $414_N$ are positioned close (e.g., between 1 millimeter and 1 centimeter) to their respective ground connections $412_1$, $412_2$, ..., $412_N$.

In operation as a transmitter, the central element 402 receives a signal via feed point 410 and radiates the signal. The energy of the radiated signal is at least partially absorbed by the coupling elements $404_1$, $404_2$, ..., $404_N$. These coupling elements, in turn, radiate the absorbed energy. One or more processors of the transmitter system 201 send signals to the variable capacitors $414_1$, $414_2$, ..., $414_N$ that causes the capacitors to change capacitance values, thus tuning the antenna to a different impedance. Similarly, signals from one or more processors in the receiver system 203 tune the variable capacitors for receiving signals.

Figure 5:
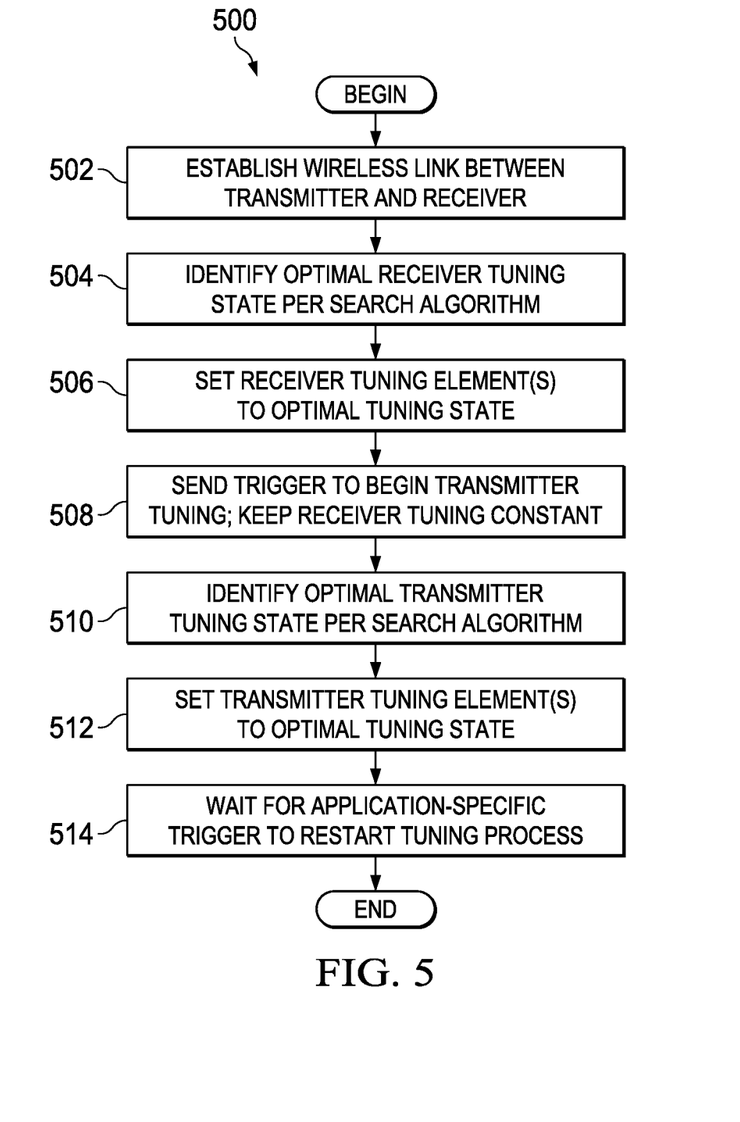
FIGS. 5-7 are flow diagrams of methods for efficient closed-loop tuning using indications of wireless signal strength.
Figure 6:
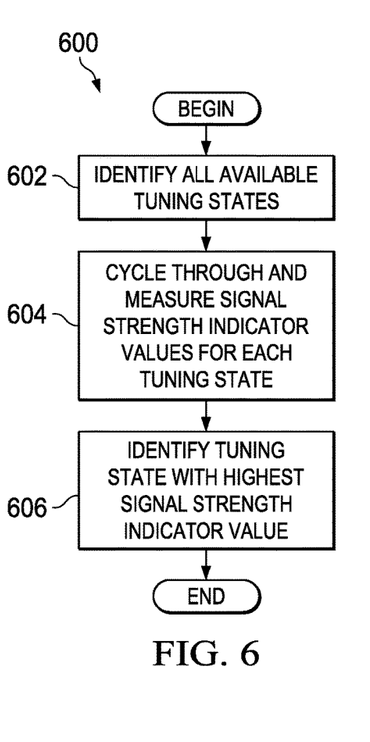
Figure 7:
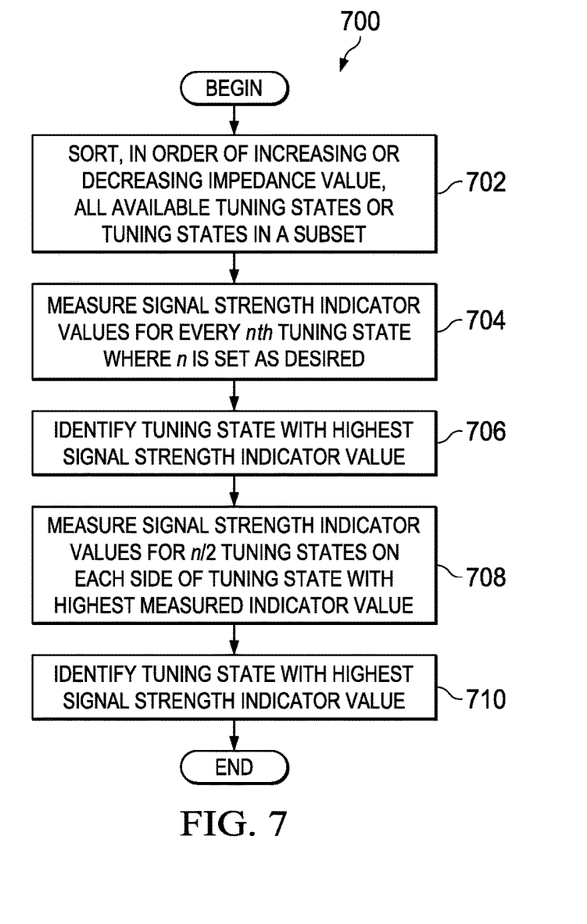

FIGS. 5-7 are flow diagrams of methods for efficient closed-loop tuning using indications of wireless signal strength. Each of these figures is now described in light of FIG. 2. Although these descriptions designate systems 201 and 203 as transmitter and receiver systems, respectively, in at least some embodiments, each of these systems contains a transceiver that enables it to act as both a transmitter and a receiver. Thus, at least some of the steps of the methods in FIGS. 5-7 are applicable to both of the systems 201 and 203.

The method 500 of FIG. 5 begins with the transmitter system 201 and receiver system 203 establishing a wireless link (step 502). The method 500 further comprises the receiver system 203 identifying an optimal receiver tuning state among a set of candidate tuning states by using a suitable search algorithm (step 504). Although illustrative search algorithms are described below with respect to FIGS. 6 and 7, briefly, this step entails one or more processors of the receiver system 203 adjusting the tunable matching network $222_2$ and/or the tunable antenna $224_2$ to a number of different tuning states and evaluating received signal strength (e.g., discrete RSSI and/or RCPI values, or RSSI and/or RCPI values that have been manipulated (e.g., averaged) as desired using signal strength analysis software $220_2$) for each of these tuning states. The "optimal" receiver tuning state is the tuning state among all tested tuning states that results in the highest (or "maximal") received signal strength. The method 500 then comprises setting the receiver system's tunable elements to the optimal tuning state (step 506). A trigger signal is then sent from the receiver system 203 to the transmitter system 201, instructing the transmitter system 201 to begin its own tuning process (step 508). The receiver tuning state is kept constant while the transmitter tunes itself so that multiple variables are not introduced to the wireless system and changes in signal strength can be attributed solely to changes in the transmitter tuning state.

The method 500 next comprises the transmitter identifying an optimal tuning state among a set of candidate tuning states by using a suitable search algorithm (step 510). Although illustrative search algorithms are described with respect to FIGS. 6 and 7 below, briefly, this step entails one or more processors of the transmitter system 201 adjusting the tunable matching network $222_1$ and/or the tunable antenna $224_1$ to a number of different tuning states and evaluating signal strength for each one. Signal strength may be evaluated by using the power detector $211_1$ to determine the signal power at the output stage of the transceiver or by monitoring the current flowing from the battery $205_1$ that supplies the transmitter system 201. (If the receiver system 203 were operating as a transmitter, its power detector $211_2$ and/or battery $205_2$ would be similarly used.) Alternatively or in addition, signal strength may be evaluated by receiving RSSI and/or RCPI values from the receiver system 203 for each of the different transmitter tuning states. One or more of these values may be analyzed (e.g., averaged) as desired using the signal strength analysis software $220_1$. The method 500 then comprises setting the tunable matching network $222_2$ and/or the tunable antenna $224_2$ to the optimal tuning state (step 512).

The receiver and transmitter tuning processes are then complete, and the method 500 comprises the receiver system 203 waiting for an application-specific trigger to restart the tuning processes (step 514). This trigger signal may be received from, e.g., a processor external to the receiver system 203 or from a processor within the receiver system 203. The trigger signal may be issued regularly or irregularly. For instance, the trigger signal may be issued after a certain amount of time has elapsed since the last such signal was issued, or it may be issued when a signal strength indicator value (or an average of such values) meets or drops below a predetermined threshold value. Similarly, the trigger signal may be issued upon the occurrence of some event— for instance, in the context of a wireless medical device, once a biological parameter has been recorded and requires transmission. The method 500 may be adjusted as desired, including by adding, deleting and/or modifying one or more steps.

In some embodiments, the method 500 may be performed twice: During a first iteration, the receiver system 203 acts as a receiver and the transmitter system 201 acts as a transmitter, and during a second iteration, the receiver system 203 acts as a transmitter (which is possible in these embodiments because the receiver system 203 is a transceiver system) and the transmitter system 201 acts as a receiver (which is possible in these embodiments because the transmitter system 201 is a transceiver system). During each of these iterations, each of the transceiver systems is tuned as described herein, and the optimal tuning states are stored for future reference in, e.g., storages $204_1$ and $204_2$. For instance, during the first iteration of the method 500, the receiver system 203 determines an optimal tuning state for itself while it acts as a receiver and the transmitter system 201 determines an optimal tuning state for itself while it acts as a transmitter. These values are stored locally in the receiver and transmitter. During the second iteration of method 500, the receiver system 203 determines an optimal tuning state for itself while it acts as a transmitter and the transmitter system 201 determines an optimal tuning state for itself while it acts as a receiver. These values are stored locally as well. Subsequent to these iterations, the receiver system 203 uses the appropriate stored optimal tuning state values when it is to act as a receiver or as a transmitter. Likewise, the transmitter system 201 uses the appropriate stored optimal tuning state values when it is to act as a transmitter or as a receiver. The stored optimal tuning states may optionally be modified over time.

FIGS. 6 and 7 describe different algorithms that may be used to identify an optimal tuning state in the transmitter and/or receiver systems. The method 600 of FIG. 6 includes identifying all available tuning states in the transmitter or receiver system (step 602). This step may include, for instance, a processor in the system identifying all switches in a corresponding tunable matching network and/or all variable capacitors (and attendant ranges) in a corresponding tunable antenna. The method 600 next includes implementing each identified tuning state and measuring signal strength indicators (e.g., discrete RSSI and/or RCPI values or averages thereof) for each such state (step 604). Finally, the method 600 comprises identifying the optimal tuning state—that is, the tuning state that maximized the signal strength indicator assessed in step 604 (step 606). The method 600 may be adjusted as desired, including by adding, deleting or modifying one or more steps.

The method 600 of FIG. 6 is suited for applications that are time insensitive because it entails implementing each possible tuning state. For time sensitive applications, fewer than all tuning states may be tested. For instance, the method 700 provides a faster technique for identifying an optimal tuning state. The method 700 of FIG. 7 comprises sorting all available tuning states (or tuning states in a subset) based on increasing or decreasing impedance values (step 702). Next, signal strength indicator values are assessed for every nth tuning state by tuning the transmitter or receiver system to that state and measuring, e.g., RSSI, RCPI, or any other suitable signal strength indicator (step 704). The tuning state with the highest signal strength indicator among the assessed tuning states is then identified (step 706). The method 700 then comprises measuring signal strength indicator values for the n/2 tuning states on each side of the tuning state identified in step 706 (step 708). For example, if n=10 and 100 tuning states are assessed, and further if the 50th tuning state in the sorted list of tuning states is identified as the optimal tuning state in step 706, then in step 708 the five tuning states preceding the 50$^{th}$ tuning state and the five tuning states following the 50$^{th}$ tuning state are implemented and signal strength indicator values are assessed for each such state. In step 710, the tuning state among the tuning states evaluated in step 708 that maximizes the signal strength indicator value is identified. The method 700 may be adjusted as desired, including by adding, deleting or modifying one or more steps.

Numerous other variations and modifications will become apparent to those skilled in the art once the above disclosure is fully appreciated. It is intended that the following claims be interpreted to embrace all such variations, modifications and equivalents.

What is claimed is:

1. A system, comprising:
    a first transceiver;
    first tunable elements coupled to the first transceiver, the first tunable elements configured to implement a plurality of tuning states that are distinct; and
    a processor coupled to the first tunable elements, the processor configured to:
        receive, a trigger signal;
        implement, responsive to the trigger signal, the plurality of tuning state;
        determine a value indicative of signal strength for each of the plurality of tuning states; and
        implement a final tuning state from the plurality of tuning states by evaluating the value indicative of signal strength for each of the plurality of tuning states.

2. The system of claim 1, wherein the processor is further configured to, after the implementation the final tuning state, transmit a trigger signal to a second transceiver with an instruction to begin tuning of second tunable elements associated with the second transceiver.

3. The system of claim 1, wherein the first tunable elements are selected from the group consisting of: a tunable antenna; and a tunable matching network.

4. The system of claim 1, wherein when the processor implements the final tuning state, the processor is further configured to implement the final tuning state having the highest value indicative of signal strength.

5. The system of claim 1, wherein when the processor determines the value indicative of signal strength for each of the plurality of tuning states, the processor is configured to determine at least one selected from a group consisting of: a received signal strength indicator (RSSI) signal; and a received channel power indicator (RCPI) signal.

6. The system of claim 1, wherein when the processor determines the value indicative of signal strength for each of the plurality of tuning states, the processor is configured to determine a value indicative of battery current during transmitting.

7. The system of claim 1, wherein when the processor determines the value indicative of signal strength for each of the plurality of tuning states, the processor is configured to determine a value indicative of signal power value during transmitting.

8. A method, comprising:
    establishing a wireless link between a transmitter system and a receiver system;
    identifying a receiver tuning state based on a strength of a received signal;
    setting one or more tunable elements in the receiver system to said identified receiver tuning state;
    sending a trigger from the receiver system to the transmitter system to begin tuning the transmitter system;
    identifying a transmitter tuning state based on a strength of a signal transmitted by said transmitter system to the receiver system; and
    setting one or more additional tunable elements in the transmitter system to said identified transmitter tuning state,
    wherein the receiver and transmitter tuning states affect impedances of the receiver and transmitter systems, respectively.

9. The method of claim 8, further comprising commencing the identification of said receiver tuning state upon the occurrence of an event selected from a group consisting of:
    a predetermined amount of time elapsing since said receiver tuning state was last set;
    a wireless device housing the receiver waking from a dormant state; and
    the received signal strength falling below a predetermined threshold.

10. The method of claim 8, wherein identifying said receiver tuning state comprises:
    tuning the receiver system to each of a set of tuning states; and
    measuring the received signal strength when the receiver system is tuned to each tuning state in said set.

11. The method of claim 10, wherein said set of tuning states includes all available tuning states in said receiver system.

12. The method of claim 10, wherein said set of tuning states includes fewer than all available tuning states in said receiver system.

13. The method of claim 8, wherein said identified transmitter tuning state maximizes a received signal strength indicator (RSSI) or a received channel power indicator (RCPI) in said receiver system.

14. The method of claim 8, wherein identifying said transmitter tuning state comprises monitoring a transmitter system battery current.

15. A wireless communication system, comprising:
    a transceiver comprising:
        an output stage power detector;
        a signal strength detector coupled to the output stage power detector; and
        a first processor coupled to the signal strength detector and configured to evaluate indications of signal strength received from the signal strength detector;
    one or more tunable elements coupled to the transceiver and having a plurality of tuning states and configured to adjust an impedance of the system; and
    a second processor coupled to the one or more tunable elements and configured to:
        receive a trigger signal from a second wireless communication system; and responsive to the trigger signal
        tune said one or more tunable elements to each of said plurality of tuning states;
        implement a final tuning state from the plurality of tuning states by evaluating the indications of signal strength.

16. The system of claim 15, wherein the output stage power detector is operable to determine a power of a signal output by the transceiver, and wherein a change to the power of the signal output by the transceiver corresponds to an output power of the wireless communications system.

17. The system of claim 15, wherein the second processor is configured to tune said one or more tunable elements based at least in part on a signal strength of the received signal determined at least partially by the first processor and the signal strength detector.

18. The system of claim 15, wherein the second processor is configured to tune said one or more tunable elements based at least in part on a signal strength of the received signal.

19. The system of claim 15, wherein each of the tunable elements comprises a first impedance element, a second impedance element, and a switch coupled between the first impedance element and the second impedance element, and wherein, to tune the one or more tunable elements based on the received signal, the second processor is configured to toggle the switch to adjust the impedance of the system based at least partially on an amount of impedance of the first impedance element and an amount of impedance of the second impedance element.

20. The system of claim 15, wherein the second processor is configured to tune the one or more tunable elements based at least in part on a signal strength indicator received by the system.

* * * * *